United States Patent [19]

Haugen

[11] Patent Number: 4,601,498
[45] Date of Patent: Jul. 22, 1986

[54] DEFORMABLE METAL-TO-METAL SEAL

[75] Inventor: David M. Haugen, Houston, Tex.

[73] Assignee: Baker Oil Tools, Inc., Orange, Calif.

[21] Appl. No.: 441,459

[22] Filed: Nov. 15, 1982

[51] Int. Cl.⁴ ............................................. F16L 25/00
[52] U.S. Cl. ................................. 285/332.3; 285/350; 285/355; 285/907; 277/236
[58] Field of Search .................. 285/332.2, 332.3, 350, 285/333, 334, DIG. 18, 55, 336, 355, 338; 277/236, 335 A, 118, 190, 191

[56] References Cited

U.S. PATENT DOCUMENTS

| | | | |
|---|---|---|---|
| 1,590,357 | 6/1926 | Feisthamel | 285/333 |
| 2,110,127 | 3/1939 | Hinderliter | 285/332.2 |
| 2,181,343 | 11/1939 | Reimschissel | 285/DIG. 18 |
| 2,380,690 | 7/1945 | Graham | 285/333 |
| 2,563,515 | 8/1951 | Brown | 285/333 |
| 3,100,656 | 8/1963 | MacArthur | 285/55 |
| 3,150,889 | 9/1964 | Watts | 285/332.2 |
| 3,185,502 | 5/1965 | MacArthur | 285/55 |
| 3,307,860 | 3/1967 | Blount et al. | 285/334 |
| 3,847,420 | 11/1974 | Seville | 285/350 |
| 4,289,334 | 9/1981 | Riley | 285/55 |

FOREIGN PATENT DOCUMENTS 866996  3/1961  United Kingdom ............... 285/334

Primary Examiner—Cornelius J. Husar
Assistant Examiner—Todd G. Williams
Attorney, Agent, or Firm—Norvell & Associates

[57] ABSTRACT

A subterranean well tool such as a packer and attached telescoping seal receptacle assembly is disclosed. The tool is fabricated from a plurality of threaded tubular members and annular deformable rings fabricated of a metal softer than the tubular members are used to establish metal-to-metal sealing integrity between interengagable component members. Upon full engagement, sealing integrity is established along the transverse interface between each tubular member and the deformed seal ring. During initial disengagement, sealing integrity is maintained along a bearing inclined interface between the ring and at least one tubular member adjacent the threaded connection.

5 Claims, 12 Drawing Figures

DEFORMABLE METAL-TO-METAL SEAL

BACKGROUND OF THE INVENTION

1. FIELD OF THE INVENTION

This invention relates a threaded connection especially for use in a tool insertable within a subterranean well, metal-to-metal sealing integrity being maintained between threaded components of the tool itself.

2. DESCRIPTION OF THE PRIOR ART

In subterranean oil and gas well applications it is often necessary to establish metal-to-metal sealing integrity between interconnecting metal components. For example, metallic rings are often employed between mating components of flanged wellhead assemblies. The flanged components are normally bolted together without relative rotation and an annular metal ring trapped within circular grooves in the mating flanges provides sealing integrity.

Often metal-to-metal seals must also be established between threaded tubular members in a production or completion tubing string and associated components. For example, well tools, such as packers, generally comprise a plurality of tubular components joined by threaded connections. It is often necessary for these threaded connections to maintain pressure differentials thereacross. The most common method of providing pressure integrity is to use conventional elastomeric O-rings to seal the interface of the tubular members adjacent the threaded interconnection. Metal-to-metal sealing integrity is also maintained between elastically stressed mated threads on certain premium threaded connections employed for tubular members used in subterranean oil or gas wells. Premium threaded connections are shown in U.S. Pat. Nos. 3,100,656 and 3,185,502.

U.S. patent application Ser. No. 384,839, filed June 4, 1982, discloses a deformable metal-to-metal sealing ring which may be employed between two tubular components comprising a downhole tool assembly. That pending patent application, assigned to the assignee of the instant application, also discloses deformable set down rings for establishing sealing integrity between separate elements in a well tool assembly. Axial compression is applied to the tubing string to urge the set down ring into engagement with a cooperable surface on the well tool assembly. Thus metal-to-metal sealing integrity may be established without the use of premium threaded connections. The present invention comprises improved metal-to-metal seals which may be employed in a subterranean packer or similar tool used in conjunction with a tubing seal receptacle for permitting tubing movement.

SUMMARY OF THE INVENTION

A fluid tight joint for joining two interengagable members, such as two threaded tubular members for use as components in a tool used in a subterranean oil or gas well, has a transverse surface and a contiguous axially extending peripheral, or lateral surface on each member in opposed relationship to the transverse and lateral surfaces on the other member. A deformable sealing member, such as a deformable ring formed of a material softer and more easily deformable than the metallic tubular members, is confined between opposed transverse and axially extending peripheral, or lateral surfaces upon full interengagement of the tubular members. In the preferred embodiment the deformable ring is formed of an extrudable metal. Using the metal sealing ring, metal-to-metal sealing integrity is initially established along the transverse interface or surface between the ring and each tubular member. Upon initial separation or disengagement of the tubular members, sealing integrity is maintained along the lateral surfaces, at least one of which is inclined relative to the axis of the tubular member and relative to the contiguous transverse surface. Sealing integrity is maintained because the radial deformation of the sealing ring during engagement means that the ring will engage the inclined lateral surface during disengagement causing further deformation and maintaining continued metal-to-metal sealing integrity. Adequate sealing integrity during full engagement and during initial disengagement is assured if the ring is confined within a longitudinal sectional area, defined by the transverse and lateral surfaces at full engagement, which is equal to or less than the longitudinal sectional area of the undeformed ring. Of course there will be some axial extrusion through gaps between mating tubular members if the ring is larger than the space within which it is to be confined. In addition to maintaining sealing integrity, this deformed seal ring trapped between relatively inclined lateral surfaces will act to resist disengagement of the tubular members which normally occurs in response to extraneous mechanical forces resulting from thermal cycling, vibration or other causes. Additional torque will be necessary even after the threads are initially broken.

DESCRIPTION OF THE PREFERRED EMBODIMENT

Figure 1A:
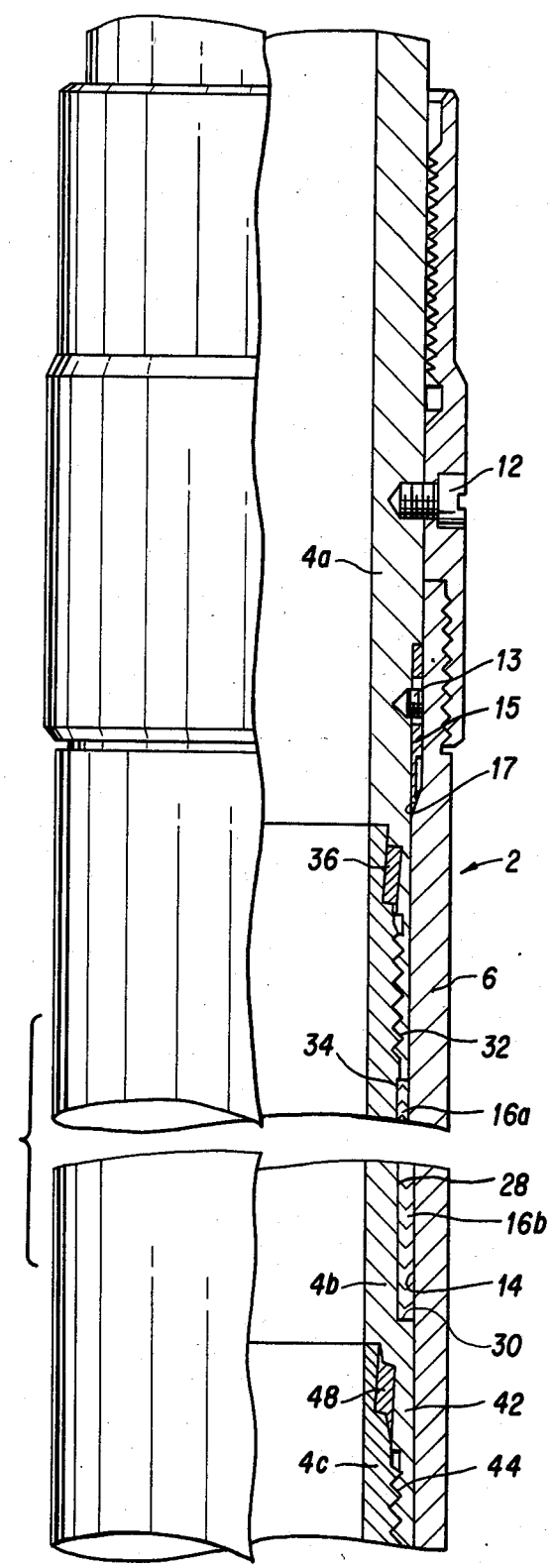
FIGS. 1A–1F represent longitudinal continuations depicting a hostile environment packer and expansion joint assembly.

The preferred embodiment of this invention is disclosed in use in a drillable packer and shear release expansion joint assembly or tubing seal receptacle for use in subterranean oil or gas wells under extreme conditions of temperature and pressure. The assembly which employs a number of metal-to-metal sealed threaded connections. This assembly is adapted for use in hostile well environments such as those where the bottom hole temperature is in excess of 350° and/or exposed to considerable high concentrations of $H_2S$ and/or $CO_2$. The packer 10 is a drillable packer having a radially expandable packing element 90 positioned between radially expandable anchoring elements 80 and 100. At its upper end, the packer is attached to anchor latch 8 which is in turn attached to a polished bore tubing seal receptacle 6 extending thereabove. An inner mandrel 4 is positioned within polished bore receptacle 6 and is attached to the tubing thereabove which extends to the surface of the well.

The conventional attachment between tubing mandrel 4 and the tubing extending above the packer expansion joint assembly is not shown in FIG. 1A. FIG. 1A does show the initial shear pinned position of the mandrel 4 and the polished bore tubing seal receptacle 6. Shear pin 12 interconnects the tubing seal receptacle 6 and mandrel 4 during initial insertion of the tubing mounted packer.

Figure 1B:
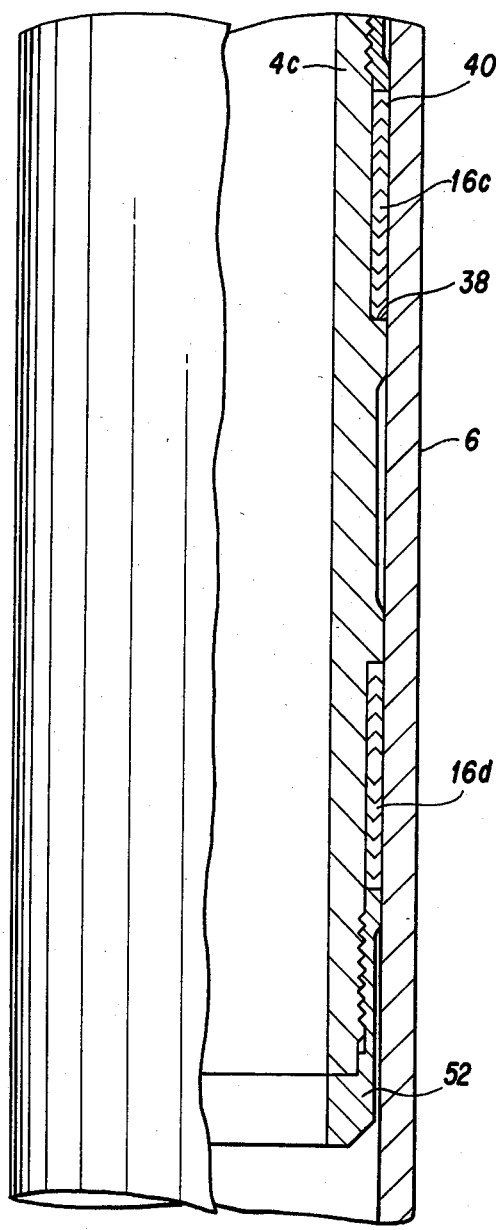

As apparent in FIGS. 1A and 1B, mandrel 4 comprises three separate sections 4a, 4b and 4c which are joined by conventional threaded connections 32 and 44. Conventional elastomeric seal assemblies 16a, 16b, 16c, and 16d are positioned between oppositely facing shoulders on various components of the mandrel 4. For example, seals 16b are positioned between downwardly facing shoulder 40 on tubular member 4b and upwardly facing shoulder 38 on tubular component 4c. In the preferred embodiment of this invention, these seals can comprise elastomeric sealing elements normally impervious to the hostile well conditions encountered during operation of this assembly. As shown in FIG. 1A, the inner bore of tubing seal receptacle 6 comprises a honed or polished surface 14 along which the elastomeric chevron seals maintain dynamic sealing integrity during telescoping movement of mandrel 4 relative to polished bore receptacle 6.

In addition to the seal established by the resilient polymeric or elastomeric chevron seal 16a, 16b and 16c. a metal-to-metal seal is established between threaded tubular components comprising inner mandrel 4. In FIG. 1A, two metal-to-metal seals are shown. Annular seal ring 36 is captured between opposed transverse and opposed axially extending peripheral or lateral surfaces on tubular components 4a and 4b. The size of seal rings 36 and 48 is exaggerated in FIG. 1A for clarity. As threaded connection 32 is made-up during interengagement of tubular components 4a and 4b, metallic ring 36 is compressed between opposed transverse surfaces, one on each tubular component 4a and 4b. Upon full engagement of threaded connection 32, a fluid tight metal-to-metal sealing connection has been established along the abutting transverse surfaces capturing seal ring 36. The laterally extending surfaces, one on each tubular component 4a and 4b, are inclined relative to the axis of the tubing seal receptacle. The opposed lateral surfaces capturing seal ring 36 are parallel and the lateral and transverse surfaces define a longitudinal-sectional area in the shape of a parallelogram. If ring 36 is formed of a material, for example ductile cast iron, which is softer than tubular components 4a and 4b and which initially has a rectangular longitudinal-sectional configuration, the ring 36 will be plastically deformed during makeup of threads 32. As seen in FIG. 1A, the deformed longitudinal-sectional configuration of ring 36 is basically a parallelogram conforming to the shape of the area between opposed transverse and lateral surfaces.

The inclined lateral surfaces capturing ring 36, which have a projection in a plane normal to the tubular axis, bear against the deformed lateral surfaces of the ring if there is any tendency for threaded connection 32 to "back off". Indeed, additional continuous torque after initial breakout or disengagement is required to fully disengage the threaded members. Forces generated by the bearing engagement of these lateral surfaces also tend to lock tubular components 4a and 4b together and prevent back off of threaded connection 32. The bearing or sliding contact between inclined lateral surfaces also continuously maintain metal-to-metal sealing integrity after initial disengagement and during at least partial disengagement. Equally important, the deformed ring 36 will remain in secure assembly with pin member 4b during disengagement to facilitate the removal of the deformed ring 36 and replacement by a new ring for a subsequent threaded connection. Since this sealing and mechanical integrity is maintained by deformation of ring 36, no appreciable radial deformation of the box and pin tubular members occurs. Lack of radial deformation is especially important in this application. Radial deformation can result if sealing integrity is being maintained by elastic deformation of the interengaged threads which occurs with some premium thread configurations. If radial deformation results in deflection of the inner tubular member of a tubing seal receptacle, the uniform inner surface which sliding elastomeric seals 16 move will be disrupted.

Polished bore receptacle 6 also comprises a plurality of tubular components with interengagable threaded connections. The threaded connection 55 between the bottom end of receptacle 6 and tubular components and 54 comprises a conventional threaded connection, which is backed up by a metal-to-metal deformable seal ring. Seal ring 58 is captured between opposed transverse and opposed lateral surfaces in the same manner as seal rings 36 and 48. The exact configuration of the surface capturing the seal ring 58 may differ from the specfic embodiments of the connections for seal rings 36 and 48. Use of deformable seal ring such as ring 58 establishes sealing integrity for a conventional threaded connection 55.

Figure 1C:
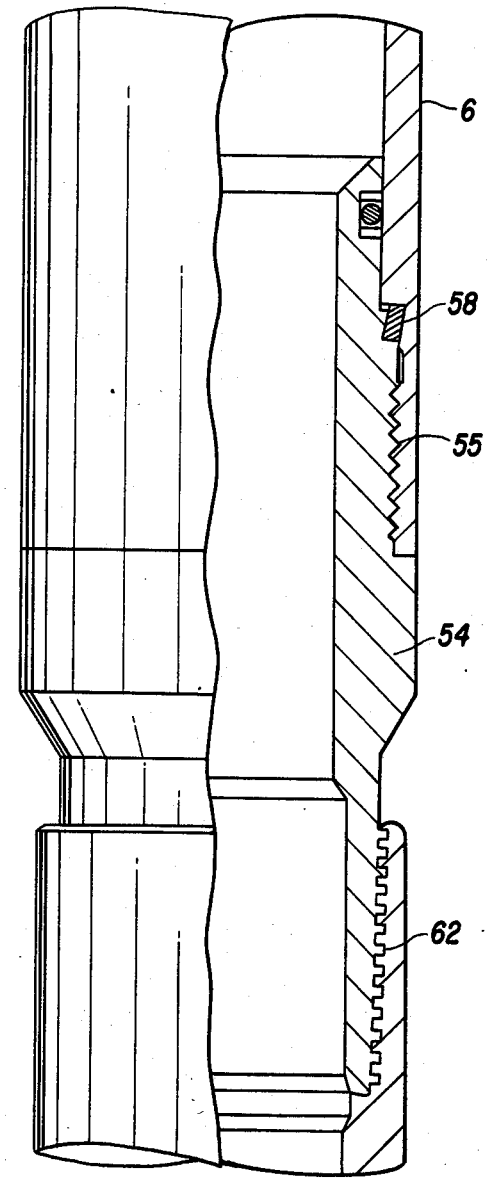
Figure 1D:
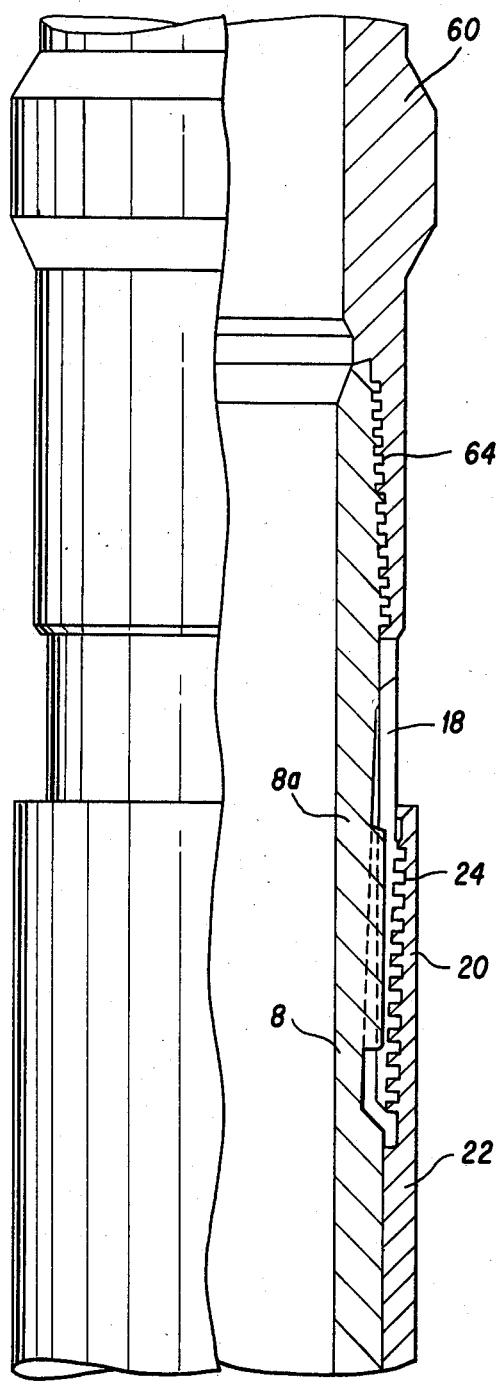
Figure 1E:
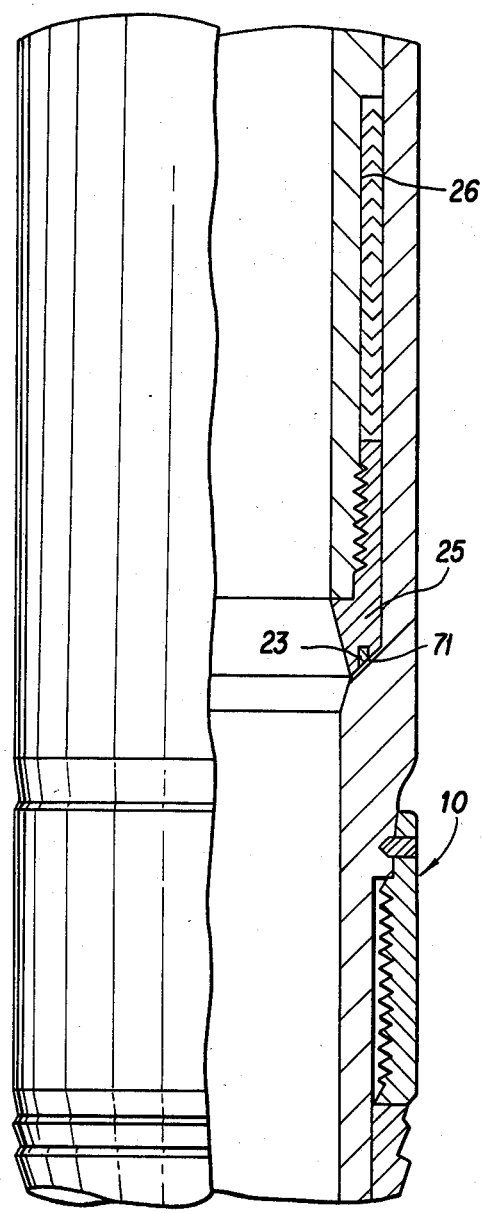

As illustrated in FIG. 1C, other means of maintaining metal-to-metal seals for threaded connections of tubular components involve the use of a premium threaded connection such as that illustrated at 62. Such "premium" threaded connections are more elaborate than the simple threaded connection such as that depicted at 55. Premium threaded connection 62 is configured to have varying threaded surfaces urged together while the tubular components are placed in relative compression or tension. These premium connections 62 have a generally more elaborate profile than that of threaded connection 55 and would normally require a larger cross-sectional area for the tubular components.

Figure 1F:
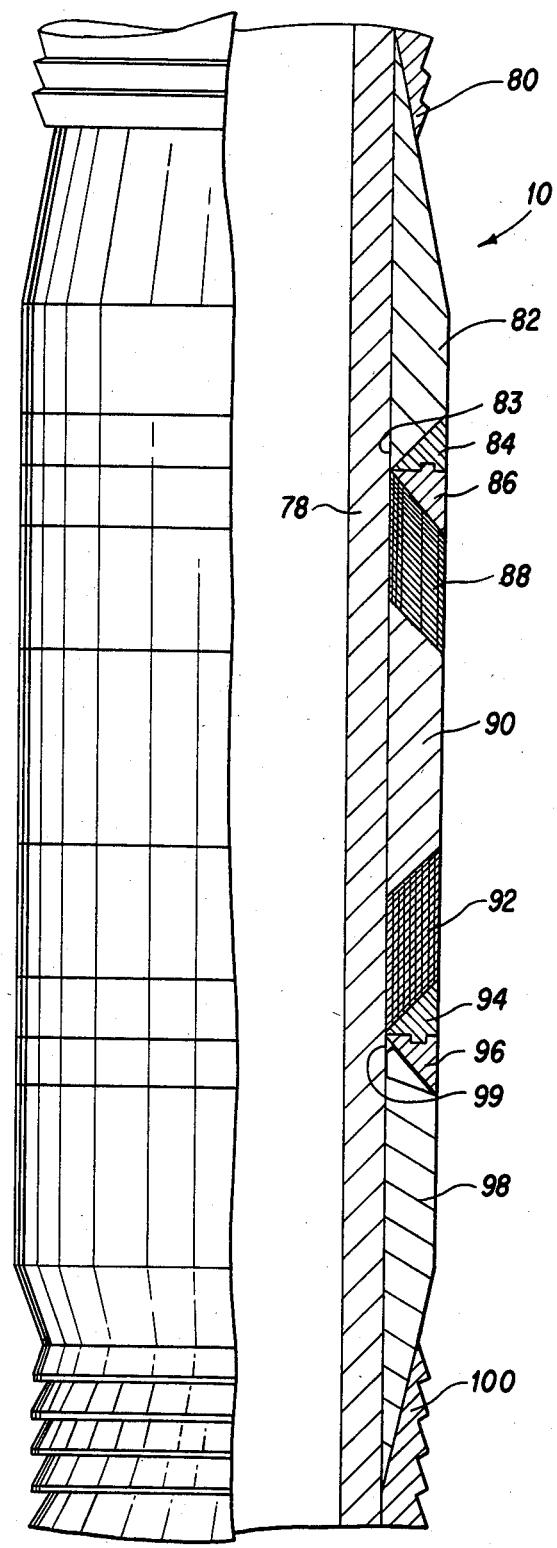
Figure 3:
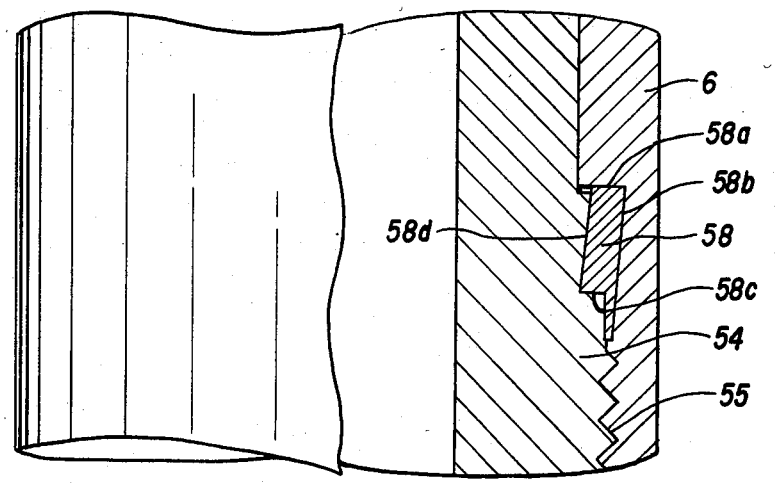
FIG. 3 is an enlarged view illustrating the embodiment of the deformable metal-to-metal sealing member shown in FIG. 1C and used for a threaded connection.

The packer itself is shown in FIG. 1F. Packer 10 is similar, although not identical, to the packer described and claimed in U.S. Pat. No. 4,326,588. Packer 10 employs oppositely facing anchor slip members 80 and 100 adapted to engage an exterior conduit, such as the casing C of a well (see FIG. 3). Cones 82 and 98, having outwardly facing inclined surfaces engage the inner inclined surfaces of slips 80 and 100 to urge these slips outwardly upon contraction of the packer body. Slips 80 and 100 are thus set in a conventional manner. Sealing integrity is established between packer 10 and the exterior conduit or casing by a packing element 90. In the preferred embodiment of this invention, packing element 90 comprises a tetrafluoroethylene member (often referred to under the trademark "Teflon"), which is noted for its resistance to hostile well environments. Secondary sealing or backup members 88 and 92 are positioned on opposite ends of Teflon sealing element 90. Backup elements 88 and 92 comprise a continuous cylindrical metallic wire mesh. In the preferred embodiment of this invention, the wire mesh comprises a seamless, knitted element fabricated from a material in filament form such as a steel wire. A knitted element of this type is described in U.S. Pat. No. 2,761,203 entitled "Resilient Gasket Forming Material and Method of Reducing Same", and U.S. Pat. No. 3,033,722, entitled "Compressible Metal Gasket and Method of Making Same", each being assigned to Metex Corporation of Edison, N.J., from which the product can be readily obtained. In the configuration depicted herein, the wire mesh serves to prevent extrusion of the Teflon element 90 along inner and outer axial flow paths which might otherwise permit relaxation of the packing element. Although metal-to-metal seal rings are shown in use only in the tubing seal receptacle 6, it should be understood that these sealing rings may be used between threaded tubular components of the packer itself.

Figure 2:
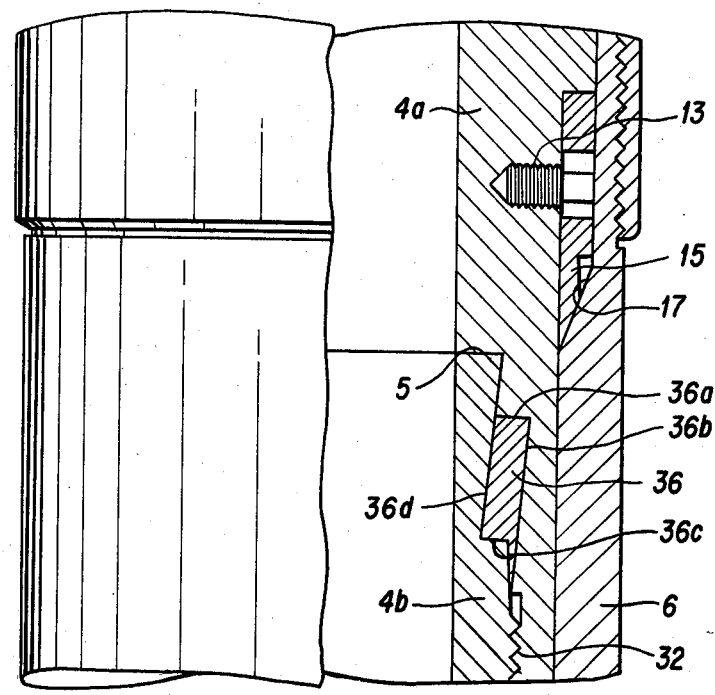
FIG. 2 is an enlarged view illustrating one embodiment of the deformable metal-to-metal sealing member and used for a threaded connection in the assembly of FIG. 1A.

FIG. 2 is an enlarged view of deformable metal sealing member 36 shown in FIG. 1A. Prior to interengagement of threaded connection 32 between mandrel section 4a and 4b, the deformable metal sealing element 36, normally having a generally rectangular longitudinal-section, can be positioned in surrounding relationship to the end of tubular element 4b which comprises the pin element of the box and pin connection between components 4a and 4b. As the threaded connection 32 is made up, deformable sealing member 36 will be trapped between opposed transverse and opposed lateral surfaces of the box and pin members. The longitudinal-sectional area defined by surfaces 36a, 36b, 36c and 36d, which is generally in the shape of a parallelogram with opposed parallel sides, defines an area which is less than the undeformed area of deformable metal sealing element 36. Therefore, element 36 extrudes axially between gaps separating opposed surfaces on the box and pin members 4a and 4b upon full engagement of box and pin members. When pin member 4b abuts box member 4a along abutting surface 5, threaded connection 32 is fully engaged or made up. In the fully made up condition box member 4a exerts a pressure on deformable sealing member 36 along transverse surface 36a. Similarly pin member 4b exerts a pressure along transverse surface 36c. In this condition metal-to-metal sealing integrity is established along surfaces 36a and 36c.

The threaded connection of this invention provides for sealing integrity in both the fully engaged and the partially disengaged configurations. Under normal operating conditions, a threaded connection will tend to relax or disengage under the effect of vibrations, thermal cycling, or other mechanical forces. Disengagement will result in a loss of sealing integrity along the surfaces 36a and 36c during initial disengagement of threaded connection 32, because the deformable metallic sealing member 36 would not possess sufficient memory or elasticity to maintain pressure along surfaces 36a and 36c. However, even initial disengagement of threaded connection 32 is resisted because of the bearing forces created between the deformable sealing member 36 and the box and pin members along lateral surfaces 36b and 36d which are inclined relative to the axis of the threaded connection. The angle of inclination need not be the same. In fact, the inclination of surface 36d on pin member 4b is preferably slightly greater than the inclination of surface 36b on box member 4a. By choosing the angles in this manner, the deformed ring 36 will be removed with the pin member upon complete disengagement of the threaded connection. The deformed ring can then be easily replaced with a new deformable ring.

In addition to resisting disengagement of threaded connection 32, the bearing contact between threaded members 4a and 4b and the deformable member 36 along surfaces 36b and 36d will act as a metal-to-metal seal thus providing continuous sealing integrity during and after initial thread disengagement. Again in the preferred embodiment of this invention, shown in FIG. 2, the volume of the deformable seal member 36 exceeds the volume of the parallelogram longitudinal-sectional area defined by surfaces 36a, 36b, 36c and 36d to insure initial deformation of the ring. Therefore, upon abutment of members 4a and 4b along surface 5 is obtained, the sealing member 36 will have extruded beyond the generally parallelogram shaped longitudinal-sectional area into the axial extrusion gaps, insuring that the deformable member is in contact with surfaces 36a, 36b, 36c and 36d. The lateral surfaces 36b and 36d are also inclined about an acute angle relative to the transverse surfaces 36a and 36c. Therefore, during disengagement of the box and pin members 4a and 4b, bearing forces are exerted in opposite directions along surfaces 36b and 36d and the deformable seal ring will act to maintain sealing integrity upon full or subsequent partial engagement of the threaded connection. The inclination of surfaces 36b and 36d results in additional deformation of the ring 36 along bearing surfaces 36b and 36d during disengagement of the threaded connection. Contact and sliding or bearing deformation between ring 36 and both box and pin members 4a and 4b is the mechanism which assures that sealing integrity is continuously maintained.

In addition to the embodiment shown in FIG. 2, the concept embodied by deformable seal ring 36 and its engagement with opposed surfaces within which the ring is confined, is equally applicable to other configurations. For example, deformable seal ring 58 employed between element 6 and 56 is shown in FIG. 1C and in FIG. 3. Note that this embodiment employs a similar deformable sealing ring which is again confined within an area shaped like a parallelogram and defined by opposed surfaces 58a, 58b, 58c and 58d. In this embodiment of the invention there is no abutting surface between the two oppositely threadable members 6 and 56, similar to surface 5 in FIG. 2. In this configuration the threaded connection is made up until ring 58 is deformed. Again initial sealing contact is along surface 58a and 58c. Of course in order to provide axial force along surfaces 58a and 58c, the threaded connection 55 located below ring 58 must carry an additional axial load. Unlike the embodiment of FIG. 2, the ring 58 shown in FIG. 3 will extrude both axially and transversely as threaded connection 55 is made up. However, sealing integrity will still be maintained along transversely extending surfaces 58a and 58c until initial disengagement of threaded connection 55, at which time sealing integrity will be similarly maintained along inclined lateral bearing surfaces 58b and 58d in the same manner as with the embodiment of FIG. 2.

Figure 4:
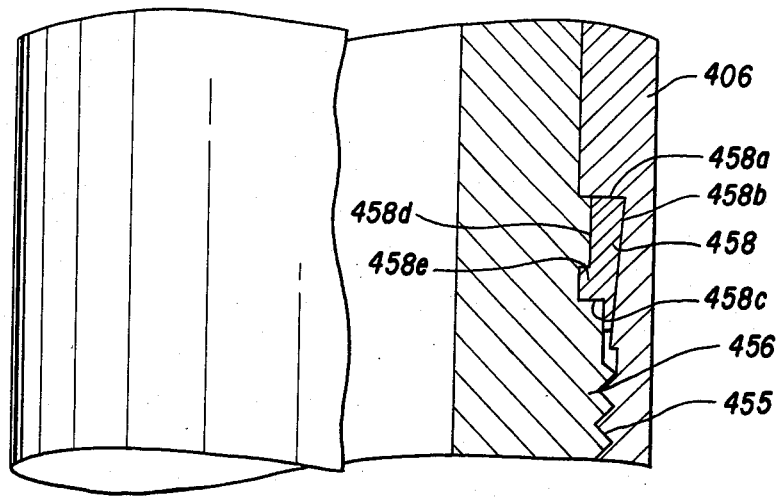
FIGS. 4–7 are views of other embodiments of the deformable sealing member.

This invention is not confined to a configuration in which the longitudinal-sectional area of the space confined in the deformable sealing ring is in the shape of a parallelogram. For example, FIG. 4 shows an alternate embodiment of this invention in which the deformable seal ring 458 is initially secured to tubular member 456 by means of a step 458e. As before, the seal ring 458 is deformed as the threaded connection 455 is made up with metal-to-metal integrity maintained along surfaces 458a and 458c. Upon initial disengagement of threaded connection 455, the step 458e securing ring 458 to tubular member 456 will tend to move the ring with the inner tubular member. Bearing contact will, however, be maintained along surface 458b which corresponds to the similar inclined surfaces 36b and 58b in FIGS. 2 and 3. As before, sealing integrity will be maintained along surface 458b during initial disengagement of threaded connection 455.

Figure 5:
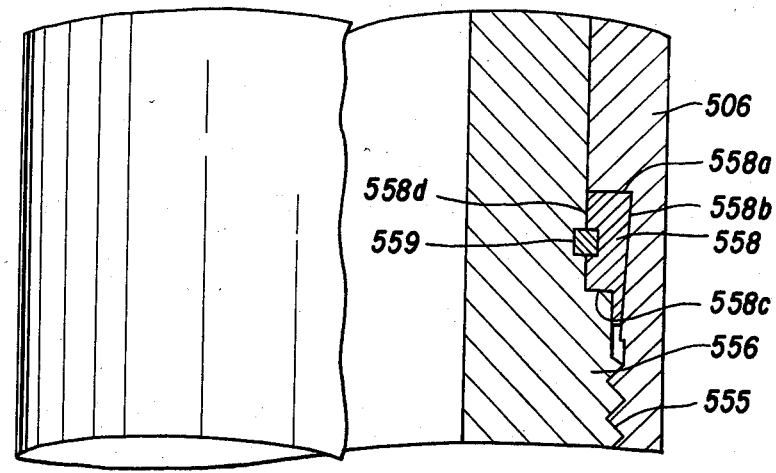

FIG. 5 shows still another embodiment of this invention in which the step 458e of FIG. 4 has been replaced by a separate member 559 engaging both ring 558 and inner tubular member 456. Sealing integrity will continue to be maintained along surface 558a and 558c until initial disengagement again creates a bearing contact along surface 558b. It should be noted that separate element 559 can comprise a split C-ring or snap ring and need not extend completely around inner tubular member 556. If the torque required to disengage threaded connection 555 in the manner described is unnecessarily large, element 559 could comprise a shear ring having a prescribed shear value. If this prescribed shear value was exceeded prior to the point at which the bearing forces along inclined lateral surface 558b sufficiently deformed ring 558 to permit disengagement of the threads, unacceptable levels of torque required to disengage threaded connection 555 could be avoided.

Figure 6:
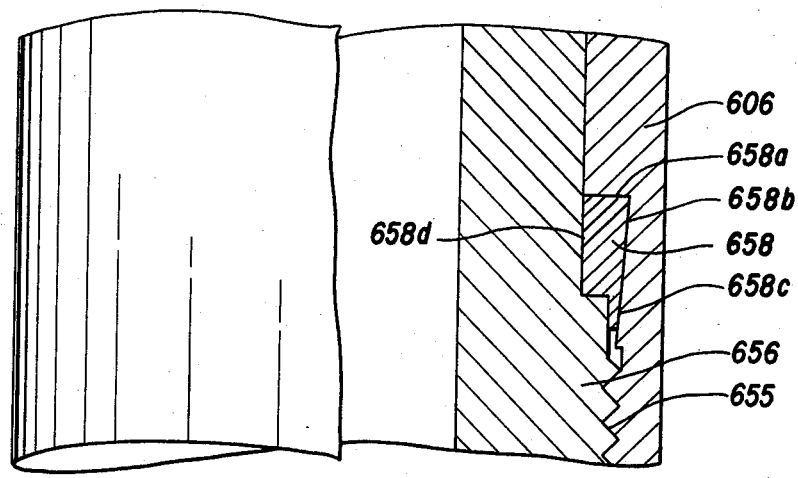

FIG. 6 represents another embodiment of this invention, also having only one inclined lateral surface 658b. The inner lateral surface 658d comprises an axially extending cylindrical surface. The deformable seal ring 658 would not be expected to provide the metal-to-metal sealing performance provided by the other embodiments disclosed herein. However, the deformation of deformable sealing ring 658a would create an additional normal force along surface 658d which would tend to increase the frictional force along that surface. Thus this frictional force would act in the opposite direction from the bearing force acting along inclined lateral surface 658b during initial disengagement of thread 655. Therefore, ring 658 would provide a certain degree of metal-to-metal sealing integrity during initial disengagement of threaded connection 655. Under some conditions the additional metal-to-metal sealing integrity provided by the configuration shown in FIG. 6 would be sufficient.

Figure 7:
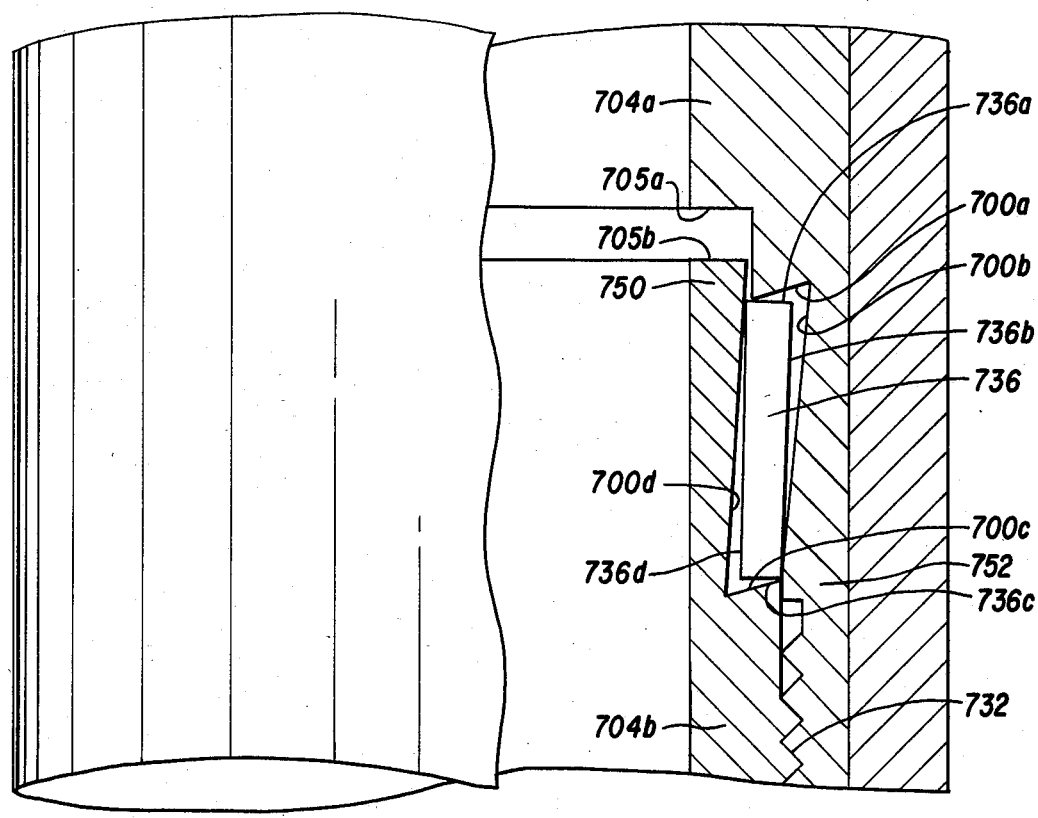

Unlike the other Figures, FIG. 7 shows a threaded connection prior to engagement. FIG. 7 illustrates that the transverse surfaces in the embodiment of FIG. 2 or of any of the other embodiments need not be normal to the axis of the tubular member. The embodiment of FIG. 7, shown prior to complete engagement, corresponds to the embodiment of FIG. 2, except that transverse surfaces 700a and 700c of tubular member 704a and 704b are inclined relative to the axis of these box and pin members. In FIG. 7, the ring 736 has not been deformed since this view shows only the initial engagement between the ring and the box and pin members. Therefore, ring 736 still retains its initial configuration, having a rectangular longitudinal section with transverse sides 736a and 736c still perpendicular to the axis of the tubular box and pin members 704a and 704b. As illustrated in FIG. 7, initial contact with ring 736 occurs at the corner of transverse surfaces 700a and 700c. Therefore the force per unit area exerted on deformable ring 736 will be greater than if the ring initial came into flush contact with a perpendicular transverse surface as would generally be the case with the embodiment of FIG. 2. Initial deformation of the ring in the vicinity of the larger pressure would occur more readily, and in addition the force exerted on the ring would have a component parallel to transverse surfaces 700a and 700c. The deformable ring 736 should therefore slide more easily along surfaces 700a and 700c, this permitting the threaded connection 732 to be made up with less torque and galling. In addition, it will be easier to establish initial sealing integrity during threaded engagement because of the higher loads and stresses present in the smaller contact area. As an additional precaution against deformation of the metallic tubular members, the inclined lateral surfaces merge with axial surfaces 750 and 752. Deformation of the sharp corners at the end of the inclined lateral surfaces which might otherwise occur after repeated use of the threaded members is thereby avoided.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A metallic threadable connection for use in a subterranean well tool comprising first and second threadably interengagable cylindrical members, one said member defining a threaded pin portion and the other member defining a threaded box portion; a non-threaded, axially extending peripheral surface on each cylindrical member; said surfaces being respectively formed adjacent said threaded pin and box portions and disposed in opposed, radially spaced apart relationship when said pin and box portions are fully threadably engaged; opposed transverse surfaces respectively formed on each of said first and second cylindrical members movable axially toward each other during threaded engagement of the pin and box portions; said peripheral surfaces and said transverse surfaces defining an annular cavity having a quadrilateral cross-section when said cylindrical members are fully threadably engaged; an annular, non-resiliently deformable, tubular sealing member freely mounted in telescopic relation to both of said axially extending peripheral surfaces when inserted intermediate said transverse surfaces prior to full threadable engagement of said cylindrical members, whereby the completion of the threaded engagement of said cylindrical members deforms said deformable sealing member to conform to said annular cavity and establish sealing integrity between the interior and exterior of the threadably interconnected pin and box portions along said transverse surfaces; one of said axially extending peripheral surfaces on said pin portion and said box portion being acutely inclined relative to the axis of said cylindrical members in a direction to produce an interference with the deformed sealing member when said cylindrical members are relatively rotated in a thread disengaging direction, whereby said deformed sealing member maintains sealing integrity along said one axially extending peripheral surface during initial disengagement of the threaded connection.

2. The apparatus of claim 1 wherein the volume of said annular cavity is less than the volume of said non-resiliently deformable annular sealing member.

3. The apparatus of claim 2 wherein said quadrilateral cross-sectional area of said annular cavity comprises a non-rectangular parallelogram.

4. The apparatus of claim 3 wherein said transverse surfaces are inclined relative to the adjacent surfaces of said non-resiliently deformable seal member.

5. The apparatus of claim 1 wherein said one of said axially extending peripheral surfaces is formed on said box portion, thereby securing the deformed sealing member to said box portion throughout disengagement of said cylindrical members.

* * * * *